US008416738B2

(12) United States Patent
Shin et al.

(10) Patent No.: US 8,416,738 B2
(45) Date of Patent: Apr. 9, 2013

(54) COMMUNICATION SYSTEM USING JOINT LEAKAGE SUPPRESSION SCHEME WITH LOW COMPLEXITY

(75) Inventors: Won Jae Shin, Yongin-si (KR); Young Jun Hong, Seoul (KR); Jung Hyun Park, Busan (KR); Chang Yong Shin, Seoul (KR); Dong Jo Park, Daejeon (KR)

(73) Assignees: Samsung Electronics Co., Ltd., Daejeon (KR); Korea Advanced Institute of Science and Technology, Daejeon (KR)

( * ) Notice: Subject to any disclaimer, the term of this patent is extended or adjusted under 35 U.S.C. 154(b) by 266 days.

(21) Appl. No.: 12/895,190

(22) Filed: Sep. 30, 2010

(65) Prior Publication Data
US 2011/0159881 A1 Jun. 30, 2011

(30) Foreign Application Priority Data
Dec. 28, 2009 (KR) ........................ 10-2009-0131551

(51) Int. Cl.
*H04W 4/00* (2009.01)
(52) U.S. Cl.
USPC ............................ 370/328; 327/329; 455/450

(58) Field of Classification Search .................. 370/328, 370/329, 330; 455/450
See application file for complete search history.

(56) References Cited

U.S. PATENT DOCUMENTS

| 6,477,161 | B1 | 11/2002 | Hudson et al. |
| 6,564,037 | B1 | 5/2003 | Sweatman et al. |
| 7,330,701 | B2 | 2/2008 | Mukkavilli et al. |
| 7,536,158 | B2 | 5/2009 | Bottomley et al. |
| 8,218,422 | B2 * | 7/2012 | Venturino et al. ............ 370/208 |
| 2012/0170677 | A1 * | 7/2012 | Venturino et al. ............ 375/267 |

FOREIGN PATENT DOCUMENTS

| KR | 10-2006-0077800 | 7/2006 |
| KR | 10-2008-0011129 | 1/2008 |

* cited by examiner

*Primary Examiner* — Kenny Lin
(74) *Attorney, Agent, or Firm* — NSIP Law

(57) ABSTRACT

A communication method for at least one mobile station that includes a target mobile station that performs a Cooperative Multi-Point (CoMP) communication with at least two base stations, is provided. The communication method includes determining a beamforming vector used by the at least two base stations based on channel vectors and at least one channel matrix such that a signal-to-leakage-plus-noise-ratio (SLNR) for a target antenna from among antennas of a target mobile station is maximized. A Cholesky factorization may be used to determine an optimal beamforming vector with a low complexity.

13 Claims, 6 Drawing Sheets

220

FROM 220

↓

VERIFY NUMBER "V" OF MOBILE STATIONS
OF WHICH CHANNEL IS CHANGED

↓

V ≤ THRESHOLD ? —NO→ TO 240

↓ YES

TO 230

COMMUNICATION SYSTEM USING JOINT LEAKAGE SUPPRESSION SCHEME WITH LOW COMPLEXITY

CROSS-REFERENCE TO RELATED APPLICATION(S)

This application claims the benefit under 35 U.S.C. §119 (a) of Korean Patent Application No. 10-2009-0131551, filed on Dec. 28, 2009, in the Korean Intellectual Property Office, the entire disclosure of which is incorporated herein by reference for all purposes.

BACKGROUND

1. Field

The following description relates to a beamforming vector that may be used by multiple transmitters in a communication system that employs Cooperative Multi-Point (CoMP) communication.

2. Description of Related Art

In data communication systems, it is desirable for a large amount of data to be transmitted at a low Bit Error Rate (BER) regardless of the existence of interference and noise. In particular, to transmit large amounts of data technologies for multi-cell communication systems have been developed. In multi-cell communication systems, a relatively large amount of interference may occur in mobile stations located at cell edges. The interference results in a reduction in the capacity of mobile stations and communication systems.

To increase the capacity of mobile stations at cell edges, technologies for Cooperative Multi-Point (CoMP) communication are being developed. In a CoMP communication scheme, a plurality of base stations may cooperate with each other to transmit data to at least one mobile station. The plurality of base stations may design an optimal beamforming matrix based on channels between the base stations and the at least one mobile station.

A scheme for implementing the CoMP communication may be classified into a joint processing scheme and a coordinated scheduling/beamforming scheme. In the joint processing scheme, each of the base stations share the transmitted data as well as information about the channels, whereas in the coordinated scheduling/beamforming scheme, each of the base stations do not share the data. However, in the coordinated scheduling/beamforming scheme, the base stations may cooperate with each other to perform scheduling and may design a beamforming vector based on a result of the scheduling.

Both the joint processing scheme and the coordinated scheduling/beamforming scheme employ algorithms for designing a beamforming vector. Among the various algorithms, a linear beamforming algorithm has a relatively low complexity. The linear beamforming algorithm includes a zero-forcing scheme and a Joint Leakage Suppression (JLS) scheme.

Generally, the JLS scheme has a superior performance in comparison to the zero-forcing scheme in a signal-to-noise ratio (SNR), when applied to mobile stations in cell edges. In other words, the JLS scheme is more suitable for the CoMP communication than the zero-forcing scheme. The JLS scheme uses an eigenvalue decomposition and matrix inverse operation to design a beamforming vector. However, the eigenvalue decomposition and matrix inverse operation may increase the overall complexity of the scheme.

SUMMARY

In one general aspect, provided is a communication method for at least one mobile station that comprises a target mobile station that performs a Cooperative Multi-Point (CoMP) communication with at least two base stations, the communication method comprising recognizing channel vectors between antennas installed in the target mobile station and the at least two base stations, and at least one channel matrix between at least one other mobile station and the at least two base stations, and determining a beamforming vector based on the channel vectors and the at least one channel matrix such that a signal-to-leakage-plus-noise-ratio (SLNR) for a target antenna from among the antennas is maximized, wherein the beamforming vector is used by the at least two base stations.

The determining may comprise calculating an inverse matrix for a sum of a noise component in the target mobile station and a leakage component between the target antenna and the at least two base stations, and calculating the beamforming vector using the inverse matrix and a channel vector, wherein the channel vector is associated with the target antenna.

The leakage component may be based on at least one channel vector and the at least one channel matrix, and the at least one channel vector may be associated with at least one other antenna.

The determining may comprise combining channel matrixes of each of the least one mobile station and calculating an overall channel matrix, applying a Cholesky factorization to a sum of the noise component and a component associated with the overall channel matrix, and extracting a first Cholesky factor, applying a Cholesky factorization to a difference of the channel vector associated with the target antenna and a component associated with the first Cholesky factor, and extracting a second Cholesky factor, and calculating the beamforming vector using the second Cholesky factor and the channel vector associated with the target antenna.

The determining may comprise calculating a noise component in the target mobile station and a leakage component between the target antenna and the at least two base stations, applying a Cholesky factorization to a sum of the noise component and the leakage component, and extracting a Cholesky factor, and calculating the beamforming vector using the Cholesky factor and the channel vector associated with the target antenna.

The communication method may further comprise in response to a change of channel occurring in a predetermined mobile station, updating the overall channel matrix, the first Cholesky factor, and the second Cholesky factor, based on the change of channel of the predetermined mobile station from among the at least one mobile station, wherein the calculating comprises calculating the beamforming factor using the updated second Cholesky factor.

The communication method may further comprise verifying a number of mobile stations that have a change in channel, and adaptively determining an algorithm based on the verified number, wherein the algorithm is used to determine the beamforming vector.

The adaptively determining may comprise adaptively determining the algorithm based on a complexity depending on the verified number.

In another aspect, provided is a communication method for at least one mobile station in a single cell communication system that comprises a target mobile station, and the single cell communication system comprising a base station, the communication method comprising recognizing channel vectors between antennas installed in the target mobile station and the base station, and at least one channel matrix between at least one other mobile station and the base station, and determining a beamforming vector based on the channel vectors and the at least one channel matrix such that an SLNR for a target antenna from among the antennas is maximized, wherein the beamforming vector is used by the base station.

The determining may comprise calculating an inverse matrix for a sum of a noise component in the target mobile station and a leakage component between the target antenna and the base station, and calculating the beamforming vector using the inverse matrix and a channel vector, wherein the channel vector is associated with the target antenna.

In another aspect, provided is a computer-readable storage medium having stored therein a program to cause a processor of a computer to implement a communication method, the method comprising recognizing channel vectors between antennas installed in the target mobile station and the at least two base stations, and at least one channel matrix between at least one other mobile station and the at least two base stations, and determining a beamforming vector based on the channel vectors and the at least one channel matrix such that a signal-to-leakage-plus-noise-ratio (SLNR) for a target antenna from among the antennas is maximized, wherein the beamforming vector is used by the at least two base stations.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

As described herein, a "base station" may include a general base station, a repeater, and the like, and a "mobile station" or "mobile terminal" may include various mobile devices, for example a mobile phone, a laptop, and the like.

Figure 1:
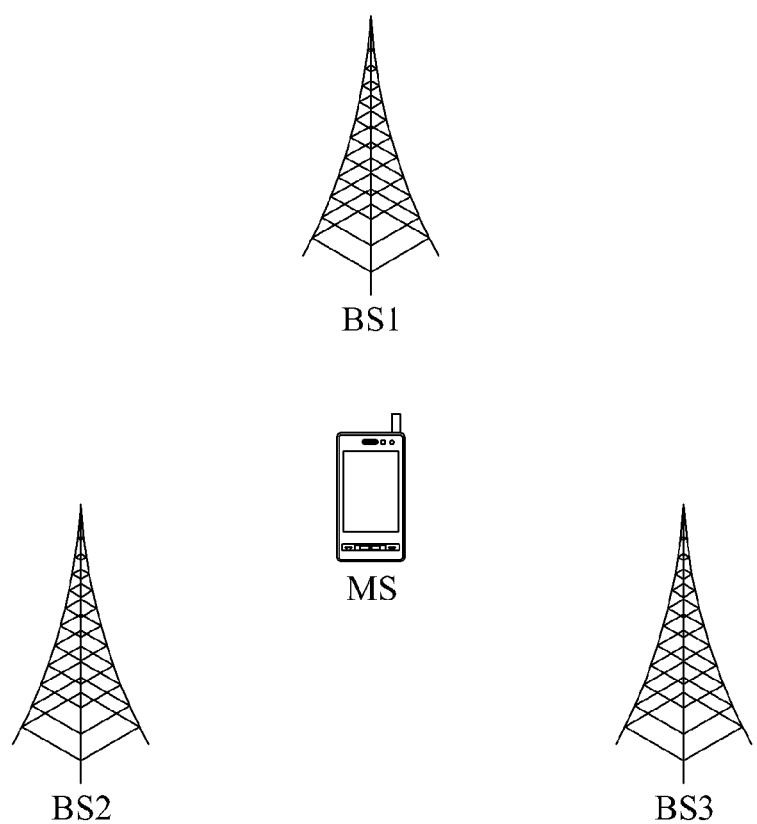
FIG. 1 is a diagram illustrating an example of a mobile station and a plurality of base stations that perform Cooperative Multi-Point (CoMP) communication.

FIG. 1 illustrates an example of a mobile station and a plurality of base stations that perform Cooperative Multi-Point (CoMP) communication.

Referring to the example shown in FIG. 1, a multi-cell communication system includes a plurality of base stations BS1, BS2, and BS3, and at least one mobile station MS.

In this example, the base stations BS1, BS2, and BS3 participate in the CoMP communication. The base stations BS1, BS2, and BS3 may cooperate with each other to simultaneously transmit data to the mobile station MS. In addition, each of the base stations BS1, BS2, and BS3 may use a beamforming vector to reduce interferences in the mobile station MS.

The CoMP communication may be implemented by joint processing and coordinated scheduling/beamforming. A system model in view of the joint processing is described below. In this example, $N_{eNB}$ corresponds to the number of base stations eNB that participate in the CoMP communication, $N_t$ corresponds to the number of antennas installed in each base station, $N_{UE}$ corresponds to the number of mobile stations, $N_r$ corresponds to the number of antennas installed in each mobile station, and $N_{stream}$ corresponds to the number of data streams for each mobile station. Each of the base stations that participate in the CoMP communication may simultaneously transmit a signal X, as represented by the following Equation 1.

$$x = \sum_{k=1}^{N_{UE}} \sum_{j=1}^{N_{stream}} w_{kj} s_{kj}. \quad \text{[Equation 1]}$$

In Equation 1, $W_{kj}$ and $S_{kj}$ correspond to a j-th beamforming vector and a data stream for an i-th mobile station, respectively. A transmission/reception relationship may be defined by the following Equation 2.

$$y_i = H_i x + n_i \quad \text{[Equation 2]}$$
$$= H_i \sum_{j=1}^{N_{stream}} w_{ij} s_{ij} + H_i \sum_{\substack{k=1 \\ k \neq i}}^{N_{UE}} \sum_{j=1}^{N_{stream}} w_{kj} s_{kj} + n_i.$$

In Equation 2, $y_i$, $H_i$, and $n_i$ correspond to a reception vector having a size of $N_r \times 1$, a channel matrix having a size of $N_r \times N_t N_{eNB}$, and a noise vector having a size of $N_r \times 1$, respectively. Elements of the noise vector may have an average of "0," and may comply with a normal distribution where the distribution is $N_o$.

A zero-forcing scheme may enable the removal of interference signals received from mobile stations other than a target mobile station. For example, the zero-forcing scheme may be used to design a beamforming vector $w_{ij}$ to satisfy the following Equation 3.

$$H_k w_{ij} = 0 \text{ if } i \neq k \quad \text{[Equation 3]}$$

To satisfy Equation 3, the beamforming vector may be obtained using the following Equation 4.

$$u_i = \max \text{ eigvector}[H_i(I - \tilde{H}_i^H(\tilde{H}_i \tilde{H}_i^H)^{-1} \tilde{H}_i)]$$

$$w_i = (I - \tilde{H}_i^H(\tilde{H}_i \tilde{H}_i^H)^{-1} \tilde{H}_i) u_i. \quad \text{[Equation 4]}$$

In Equation 4, and $\tilde{H}_i = [H_1^H H_2^H \ldots H_{i-1}^H H_{i+1}^H \ldots H_{N_{UE}}^H]^H$ and max eigvector[●] correspond to a right eigenvector having a maximum singular value of a corresponding matrix. When $N_{stream}$ is "1," a single $w_i$ may be formed by searching for the right eigenvector having the maximum singular value based on Equation 4. When $N_{stream}$ is greater than "1", $N_{stream}$ $w_i$s may be formed by searching for $N_{stream}$ eigenvectors in a descending order of singular values. In addition a normalization operation, for example, $w_i = w_i/\|w_i\|$ may be performed, so that a desired beamforming vector may be obtained.

A Joint Leakage Suppression (JLS) scheme may be used to maximize a signal-to-leakage-plus-noise-ratio (SLNR). A JLS beamforming vector for the i-th mobile station may be obtained based on $SLNR_i$ represented by the following Equation 5.

$$SLNR_i = \frac{\|H_i w_i\|^2}{N_r N_o + \sum_{\substack{k=1 \\ k \neq i}}^{N_{UE}} \|H_k w_i\|^2} \quad \text{[Equation 5]}$$

$$= \frac{\|H_i w_i\|^2}{N_r N_o + \|\tilde{H}_i w_i\|^2}$$

$$= \frac{w_i^H H_i^H H_i w_i}{w_i^H (N_r N_o I + \tilde{H}_i^H \tilde{H}_i) w_i}.$$

An optimal beamforming vector based on the JLS scheme may be obtained by the Rayleigh-Ritz inequality, as shown in the following Equation 6.

$$w_i = \max \text{eigvector}[(N_r N_o I + \tilde{H}_i^H \tilde{H}_i)^{-1} \tilde{H}_i^H \tilde{H}_i]. \quad \text{[Equation 6]}$$

In Equation 6, max eigvector[●] corresponds to an eigenvector having a maximum eigenvalue of a corresponding matrix. Because a matrix of Equation 6 is a square matrix, max eigvector[●] in Equation 6 is the same as max eigvector [●] in Equation 4. Similar to the zero-forcing scheme, when $N_{stream}$ is "1," a single $w_i$ may be formed by searching for the eigenvector having the maximum eigenvalue based on Equation 6. When $N_{stream}$ is greater than "1", $N_{stream}$ $w_i$s may be formed by searching for $N_{stream}$ eigenvectors in a descending order of eigenvalues. In addition, the normalization operation, for example, $w_i = w_i/\|w_i\|$ may be performed such that a desired beamforming vector may be obtained.

Values of the $SLNR_i$ may be distributed by the Rayleigh-Ritz inequality, as shown in the following Equation 7.

$$\lambda_{min}[(N_r N_o I + \tilde{H}_i^H \tilde{H}_i)^{-1} H_i^H H_i] \leq SLNR_i \leq \lambda_{max}[(N_r N_o I + \tilde{H}_i^H \tilde{H}_i)^{-1} H_i^H H_i]. \quad \text{[Equation 7]}$$

A system model in view of the coordinated scheduling/ beamforming is described below. $N_{eNB}$ corresponds to the number of base stations that participate in the CoMP communication, $N_t$ corresponds to the number of antennas installed in each base station, $N_{UE}$ corresponds to the number of mobile stations, $N_r$ corresponds to the number of antennas installed in each mobile station, and $N_{stream}$ corresponds to the number of data streams for each mobile station. A predetermined base station may transmit a signal $x_i$ for the i-th mobile station, as represented by the following Equation 8.

$$x_i = \sum_{j=1}^{N_{stream}} w_{ij} s_{ij}. \quad \text{[Equation 8]}$$

In Equation 8, $w_{ij}$ and $s_{ij}$ correspond to a j-th beamforming vector and data for the i-th mobile station, respectively. Additionally, $x_i$ may be assigned to a base station that enables an increase in performance using a coordinated scheduling scheme. A final transmission signal may be represented by the following Equation 9.

$$x = f(x_i, \text{scheduling info}) \quad \text{[Equation 9]}$$

In Equation 9, "scheduling info" denotes scheduling information used to show a transmission/reception relationship between a mobile station and a base station. The transmission/reception relationship may be represented by the following Equation 10.

$$y_i = H_i x + n_i \quad \text{[Equation 10]}$$

$$= H_i \sum_{j=1}^{N_{stream}} w_{ij} s_{ij} + H_i \sum_{\substack{k=1 \\ k \neq i}}^{N_{UE}} \sum_{j=1}^{N_{stream}} w_{kj} s_{kj} + n_i.$$

In Equation 10, $y_i$, $H_i$, and $n_i$ correspond to a reception vector having a size of $N_r \times 1$, a channel matrix having a size of $N_r \times N_t N_{eNB}$, and a noise vector having a size of $N_r \times 1$, respectively. Elements of the noise vector may have an average of "0," and may comply with a normal distribution where a distribution is $N_o$.

To apply the zero-forcing scheme in view of the coordinated scheduling/beamforming, a coordinated scheduling scheme may be performed first. For example, the coordinated scheduling scheme may performed in view of a greedy algorithm by setting a norm of a channel to a metric. Accordingly, a base station may be determined to transmit signals to each mobile station. When the coordinated scheduling scheme is completed, a coordinated beamforming scheme may be performed. The coordinated beamforming scheme may be similar to the "joint processing without instant cell power constraint" as described above. Because interference signals received from mobile stations other than a target mobile station may be removed using the zero-forcing scheme, the zero-forcing scheme may be used to design a beamforming vector satisfying the following Equation 11.

$$H_{ik_i} w_j = 0 \text{ if } i \neq j. \quad \text{[Equation 11]}$$

In Equation 11, $k_i$ corresponds to an index of a base station to which the i-th mobile station is assigned. To satisfy Equation 11, the beamforming vector may be obtained using the following Equation 12.

$$u_i = \max \text{eigvector}[H_{ik_i}(I - \tilde{H}_{ik_i}^H (\tilde{H}_{ik_i} \tilde{H}_{ik_i}^H)^{-1} \tilde{H}_{ik_i})]$$

$$w_i = (I - \tilde{H}_{ik_i}^H (\tilde{H}_{ik_i} \tilde{H}_{ik_i}^H)^{-1} \tilde{H}_{ik_i}) u_i. \quad \text{[Equation 12]}$$

In Equation 12, $\tilde{H}_{ik_i} = [H_{1k_i}^H H_{2k_i}^H \ldots H_{i-1k_i}^H H_{i+1k_i}^H \ldots H_{ik_i}^H \ldots H_{N_{UE}k_i}^H]^H$. When $N_{stream}$ is "1," a single $w_i$ may be formed by searching for a right eigenvector having a maximum singular value based on Equation 12. When $N_{stream}$ is greater than "1", $N_{stream}$ $w_i$s may be formed by searching for $N_{stream}$ eigenvectors in a descending order of singular values. In addition, a normalization operation, for example, $w_i = w_i/\|w_i\|$ may be performed and a desired beamforming vector may be obtained.

The JLS scheme in the coordinated scheduling/beamforming may be used to maximize the SLNR. A beamforming vector for the i-th mobile station based on the JLS scheme may be obtained based on the $SLNR_i$ that is represented by the following Equation 13:

$$SLNR_i = \frac{w_i^H H_{ik_i}^H H_{ik_i} w_i}{w_i^H (N_r N_o I + \tilde{H}_{ik_i}^H \tilde{H}_{ik_i}) w_i}. \quad \text{[Equation 13]}$$

The coordinated scheduling scheme may be performed using the greedy algorithm based on a value of the $SLNR_i$ as represented by Equation 13 Accordingly, a base station may be determined to transmit data to each mobile station. An optimal beamforming vector based on the JLS scheme may be obtained by the Rayleigh-Ritz inequality, as shown in the following Equation 14.

$$w_i = \max \text{eigvector}[(N_r N_o I + \tilde{H}_{ik_i}^H \tilde{H}_{ik_i})^{-1} H_{ik_i}^H H_{ik_i}]. \quad \text{[Equation 14]}$$

When $N_{stream}$ is "1," a single $w_i$ may be formed by searching for a right eigenvector having a maximum singular value based on Equation 14. When $N_{stream}$ is greater than "1", $N_{stream}$ $w_i$s may be formed by searching for $N_{stream}$ eigenvectors in a descending order of singular values. In addition, a normalization operation, for example, $w_i = w_i/\|w_i\|$ may be performed such that a desired beamforming vector may be obtained.

Values of the $SLNR_i$ may be distributed by the Rayleigh-Ritz inequality, as shown in the following Equation 15.

$$\lambda_{min}[(N_r N_o I + \tilde{H}_{ik_i}^H \tilde{H}_{ik_i})^{-1} H_{ik_i}^H H_{ik_i}] \leq SLNR_i \leq \lambda_{max}$$
$$[(N_r N_o I + \tilde{H}_{ik_i}^H \tilde{H}_{ik_i})^{-1} H_i^H H_i]. \quad \text{[Equation 15]}$$

To calculate a beamforming vector using the above-described JLS scheme, a matrix inverse operation and eigenvalue decomposition may be used. The matrix inverse operation and eigenvalue decomposition may each have a complexity of $O((N_r N_{eNB})^3)$, and may affect the complexity used to calculate the beamforming vector based on the JLS scheme. Accordingly, the JLS algorithm 1 may multiply a matrix by a vector, instead of performing the eigenvalue decomposition, to minimize the complexity in the matrix inverse operation. A beamforming vector may be obtained based on $SLNR_i$ represented by the following Equation 16.

$$SLNR_i = \frac{\|H_i w_i\|^2}{N_r N_o + \sum_{\substack{k=1 \\ k \neq i}}^{N_{UE}} \|H_k w_i\|^2}$$

$$= \frac{\|H_i w_i\|^2}{N_r N_o + \|\tilde{H}_i w_i\|^2}$$

$$= \frac{w_i^H H_i^H H_i w_i}{w_i^H (N_r N_o I + \tilde{H}_i^H \tilde{H}_i) w_i}$$

$$= \frac{w_i^H [h_{1i}^H \ h_{2i}^H \ \cdots \ h_{N_r i}^H] \begin{bmatrix} h_{1i} \\ h_{2i} \\ \vdots \\ h_{N_r i} \end{bmatrix} w_i}{w_i^H (N_r N_o I + \tilde{H}_i^H \tilde{H}_i) w_i}.$$

[Equation 16]

In Equation 16, $h_{ji}$ corresponds to a channel through which a signal is received to a j-th antenna of the i-th mobile station. In other words, $h_{ji}$ refers to a row vector having a size of $1 \times (N_t N_{eNB})$. A rank of $H_i^H H_i$ is $N_r$. For example, when a "rank1matrix" $h_{ji}^H h_{ji}$ is used instead of $H_i^H H_i$, the $SLNR_{ji}$ of the following Equation 17 may be obtained.

$$SLNR_{ji} = \frac{w_i^H h_{ji}^H h_{ji} w_i}{w_i^H (N_r N_o I + \tilde{H}_{ji}^H \tilde{H}_{ji}) w_i} \quad \text{[Equation 17]}$$

In Equation 17, $\tilde{H}_{ji} = [H_1^H H_2^H \ldots H_{i-1}^H [h_{1i}^H h_{2i}^H \ldots h_{j-1,i}^H h_{j+1,i}^H \ldots h_{Ni}^H] H_{i+1}^H \ldots H_{N_{UE}}^H]^H$. The $SLNR_{ji}$ may be obtained by applying the JLS scheme in view of the j-th antenna of the i-th mobile station. Examples of the range of values of $SLNR_{ji}$ are shown in the following Equation 18.

$$\lambda_{min}[(N_r N_o I + \tilde{H}_{ji}^H \tilde{H}_{ji})^{-1} h_{ji}^H h_{ji}] \leq SLNR_{ji} \leq \lambda_{max}$$
$$[(N_r N_o I + \tilde{H}_{ji}^H \tilde{H}_{ji})^{-1} h_{ji}^H h_{ji}]. \quad \text{[Equation 18]}$$

$(N_r N_o I + \tilde{H}_{ji}^H \tilde{H}_{ji})^{-1} h_{ji}^H h_{ji}$ has a rank of $h_{ji}^H h_{ji}$, which is "1." In other words, $(N_r N_o I + \tilde{H}_{ji}^H \tilde{H}_{ji})^{-1} h_{ji}^H h_{ji}$ may have a single eigenvalue other than "0," and $N_r N_{eNB} - 1$ eigenvalues may have a value of "0." Accordingly, a value of $SLNR_{ji}$ may be set to be a single eigenvalue other than "0," and may be represented by the following Equation 19.

$$SLNR_{ji} = \lambda \left[ (N_r N_o I + \tilde{H}_{ji}^H \tilde{H}_{ji})^{-1} h_{ji}^H h_{ji} \right] \quad \text{[Equation 19]}$$

$$= tr \left[ (N_r N_o I + \tilde{H}_{ji}^H \tilde{H}_{ji})^{-1} h_{ji}^H h_{ji} \right]$$

$$= h_{ji} (N_r N_o I + \tilde{H}_{ji}^H \tilde{H}_{ji})^{-1} h_{ji}^H.$$

Because a trace of a matrix is equal to a sum of eigenvalues of the matrix, Equation 19 may be obtained. In addition, because a trace operator has a cyclic property, a last equation in Equation 19 may be obtained. A beamforming vector based on the JLS algorithm 1 used to obtain the $SLNR_{ji}$ shown in Equation 19 may be represented by the following Equation 20.

$$w_i = (N_r N_o I + \tilde{H}_{ji}^H \tilde{H}_{ji})^{-1} h_{ji}^H. \quad \text{[Equation 20]}$$

When $N_{stream}$ is "1," a single $w_i$ may be formed by searching for a right eigenvector corresponding to a maximum $SLNR_{ji}$. When $N_{stream}$ is greater than "1", $N_{stream}$ $w_i$s may be formed by searching for $N_{stream}$ eigenvectors in a descending order of $SLNR_{ji}$. In addition, the normalization operation, for example, $w_i = w_i/\|w_i\|$, may be performed such that a desired beamforming vector may be obtained.

To obtain a beamforming vector $w_i$, a matrix inverse operation, for example, $(N_r N_o I + \tilde{H}_{ji}^H \tilde{H}_{ji})^{-1}$ may be performed for each antenna in a mobile station. The matrix inverse operation may have a complexity of $O(n^3)$. In the matrix inverse operation, an inverse of a matrix may be calculated $N_r N_{UE}$ number of times and thus, a large number of loads may occur. To reduce the loads, the following Equation 21 may be used.

$$H^H H = \sum_{i=1}^{N_{UE}} \sum_{j=1}^{N_r} h_{ji}^H h_{ji}. \quad \text{[Equation 21]}$$

In Equation 21, an overall channel matrix satisfies $H = [H_1^H H_2^H \ldots H_{N_{UE}}^H]^H$. In addition, the following Equation 22 may be derived from Equation 21.

$$N_r N_o I + \tilde{H}_{ji}^H \tilde{H}_{ji} = N_r N_o I + H^H H - h_{ji}^H h_{ji} \quad \text{[Equation 22]}$$

$$= U^H U - h_{ji}^H h_{ji}$$

$$= U_{ji}^H U_{ji}$$

In Equation 22, $N_r N_o I + H^H H = U^H H$, and U corresponds to an upper triangular matrix obtained by a Cholesky factorization. In addition, $U^H U - h_{ji}^H h_{ji} = U_{ji}^H U_{ji}$, and $U_{ji}$ may be obtained from a Rank 1 Update to Cholesky Factorization (R1UCF). Because $N_r N_o I + \tilde{H}_{ji}^H \tilde{H}_{ji}$ is always a positive-definite, $U_{ji}$ may be stably calculated. The Cholesky factorization used to obtain U may be performed once for all mobile stations, and may have a complexity of $O(n^3)$. The R1UCF used to obtain $U_{ji}$ may be performed $N_r N_{UE}$ number of times, and may have a complexity of $O(n^3)$.

The $SLNR_{ji}$ calculated again based on the above Equations may be represented by the following Equation 23.

$$SLNR_{ji} = \frac{w_i^H h_{ji}^H h_{ji} w_i}{w_i^H U_{ji}^H U_{ji} w_i}.$$  [Equation 23]

When the beamforming vector $w_i$ is excluded from Equation 23, the $SLNR_{ji}$ may be represented by the Equation 24 below. In addition, the beamforming vector $w_i$ may be shown in Equation 24 below.

$$SLNR_{ji} = h_{ji} U_{ji}^{-1} U_{ji}^{-H} h_{ji}^H$$  [Equation 24]
$$= |h_{ji} U_{ji}^{-1}|^2$$
$$w_i = U_{ji}^{-1} U_{ji}^{-H} h_{ji}^H$$

The normalization operation, for example, $w_i = w_i / \|w_i\|$ may also be used. A scheme for $N_{stream}$ may be the same as the scheme described above.

The JLS algorithm 2 may be used to reduce the amount of calculations for a beamforming vector based on the JLS algorithm using information calculated in advance. The JLS algorithm 2 may be used when only a channel corresponding to a predetermined mobile station is changed, for example, in an environment where only the predetermined mobile suddenly moves to a different location. Accordingly, in this example it is assumed that an $i_1$-th mobile station is moving and only a channel of the $i_1$-th mobile station is changed. The change of the channel of the $i_1$-th mobile station may be represented by the following Equation 25.

$$h_{ji_1}(n) \rightarrow h_{ji_1}(n+1) \text{ for } j=1,2,\ldots,N_r$$  [Equation 25]

A multiplication in the overall channel matrix at an n-th time may be represented by the following Equation 26.

$$H^H(n)H(n) = \sum_{i=1}^{N_{UE}} \sum_{j=1}^{N_r} h_{ji}^H(n) h_{ji}(n).$$  [Equation 26]

A multiplication in the overall channel matrix at an (n+1)th time may be represented by the following Equation 27.

$$H^H(n+1)H(n+1) = \sum_{i=1}^{N_{UE}} \sum_{j=1}^{N_r} h_{ji}^H(n+1) h_{ji}(n+1) =$$  [Equation 27]

$$\sum_{\substack{i=1 \\ i \neq i_1}}^{N_{UE}} \sum_{j=1}^{N_r} h_{ji}^H(n) h_{ji}(n) + \sum_{j=1}^{N_r} h_{ji_1}^H(n+1) h_{ji_1}(n+1) =$$

$$H^H(n)H(n) - \sum_{j=1}^{N_r} h_{ji_1}^H(n) h_{ji_1}(n) +$$

$$\sum_{j=1}^{N_r} h_{ji_1}^H(n+1) h_{ji_1}(n+1).$$

In Equation 27, there is no change in channels other than the channel of the $i_1$-th mobile station and thus, a last equation of Equation 30 may be obtained.

Because the final aspect is to obtain $U_{ji}(n+1)$, Equation 28 may be written as follows.

$$N_r N_o I + H^H(n+1)H(n+1) =$$  [Equation 28]

$$N_r N_o I + H^H(n)H(n) - \sum_{j=1}^{N_r} h_{ji_1}^H(n) h_{ji_1}(n) +$$

$$\sum_{j=1}^{N_r} h_{ji_1}^H(n+1) h_{ji_1}(n+1) =$$

$$U^H(n)U(n) - \sum_{j=1}^{N_r} h_{ji_1}^H(n) h_{ji_1}(n) +$$

$$\sum_{j=1}^{N_r} h_{ji_1}^H(n+1) h_{ji_1}(n+1) = U^H(n+1)U(n+1).$$

In Equation 28, $U(n)$ corresponds to a value obtained by applying the Cholesky factorization to $N_r N_o I + H^H(n)H(n)$, and refers to information that is calculated in advance. To obtain $U(n)$ through $U(n+1)$, the R1UCF may be performed $2N_r$ number of times.

$$N_r N_o I + \tilde{H}_{ji}^H(n+1) \tilde{H}_{ji}(n+1) =$$  [Equation 29]

$$N_r N_o I + H^H(n+1)H(n+1) - h_{ji}^H(n+1) h_{ji}(n+1) =$$

$$U^H(n+1)U(n+1) - h_{ji}^H(n+1) h_{ji}(n+1) =$$

$$U_{ji}^H(n+1) U_{ji}(n+1)$$

In Equation 29, $U_{ji}(n+1)$ may be obtained by applying the R1UCF $N_{UE} N_r$ number of times to $U(n+1)$. In other words, the R1UCF may be performed $(N_{UE}+2)N_r$ number of times based on both Equations 27 and 28. For example, when $N_v$ mobile stations are moving, the R1UCF may be performed $(N_{UE}+2N_v)N_r$ number of times. Based on the calculated $U_{ji}(n+1)$, $SLNR_{ji}$ and beamforming vector $w_i$ may be obtained using the following Equation 30.

$$SLNR_{ji} = h_{ji}(n+1) U_{ji}^{-1}(n+1) U_{ji}^{-H}(n+1) h_{ji}^H(n+1)$$  [Equation 30]
$$= |h_{ji}(n+1) U_{ji}^{-1}(n+1)|^2$$
$$w_i = U_{ji}^{-1}(n+1) U_{ji}^{-H}(n+1) h_{ji}^H(n+1).$$

In this example, the normalization operation, for example, $w_i = w_i / \|w_i\|$ may also be used. A scheme for $N_{stream}$ may be the same as the scheme described above.

Figure 2:
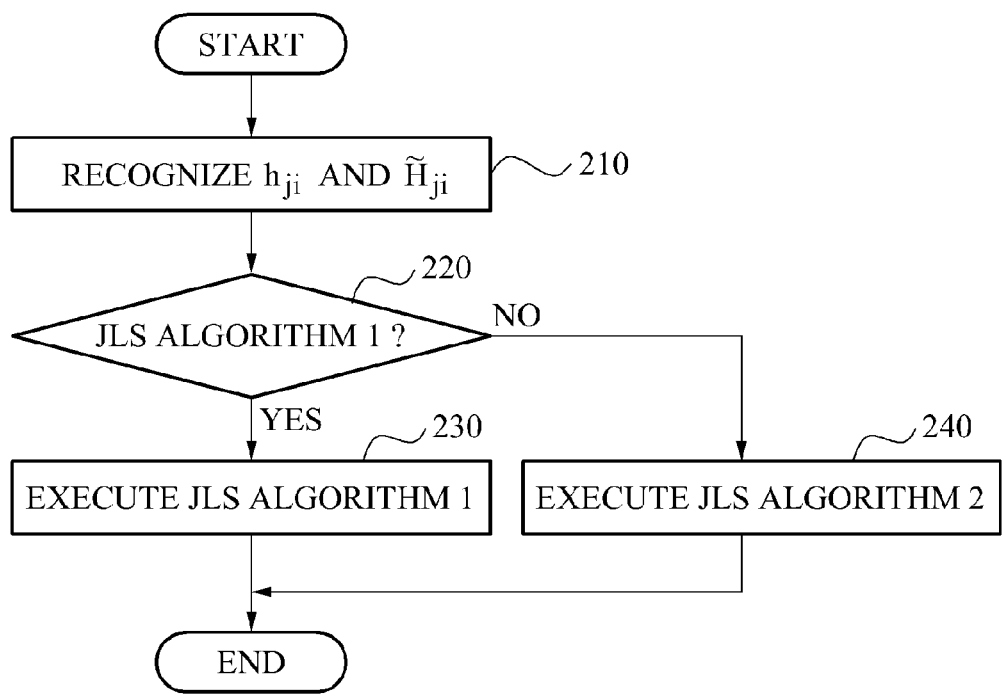
FIG. 2 is a flowchart illustrating an example of a communication method.

FIG. 2 illustrates an example of a communication method.

Hereinafter, an i-th mobile station and a j-th antenna of the i-th mobile station are referred to as a "target mobile station" and a "target antenna."

Referring to FIG. 2 in 210, channel vectors $h_{ji}$ and $\tilde{H}_{ji}$ between the target antennas and at least two base stations may be recognized. In this example, $\tilde{H}_{ji} = [H_1^H H_2^H \ldots H_{i-1}^H [h_{1i}^H h_{2i}^H \ldots h_{j-1,i}^H h_{j+1,i}^H \ldots h_{N_r i}^H] H_{i+1}^H \ldots H_{N_{UE}}^H]^H$, and indicates a channel matrix between the at least two base stations and at least one remaining mobile station other than the target mobile station, and also indicates channel vectors between the at least two base stations and at least one remaining antenna other than the target antenna from among antennas installed in the target mobile station.

At least one beamforming vector may be determined such that an SLNR for each antenna installed in the target mobile station may be maximized. In this example, the JLS algorithm 1 and the JLS algorithm 2 may be used to reduce the complexity.

In 220, whether to execute the JLS algorithm 1 may be determined. In 230 and 240, either the JLS algorithm 1 or the JLS algorithm 2 may be executed based on a result of the determining in 220.

Figure 3:
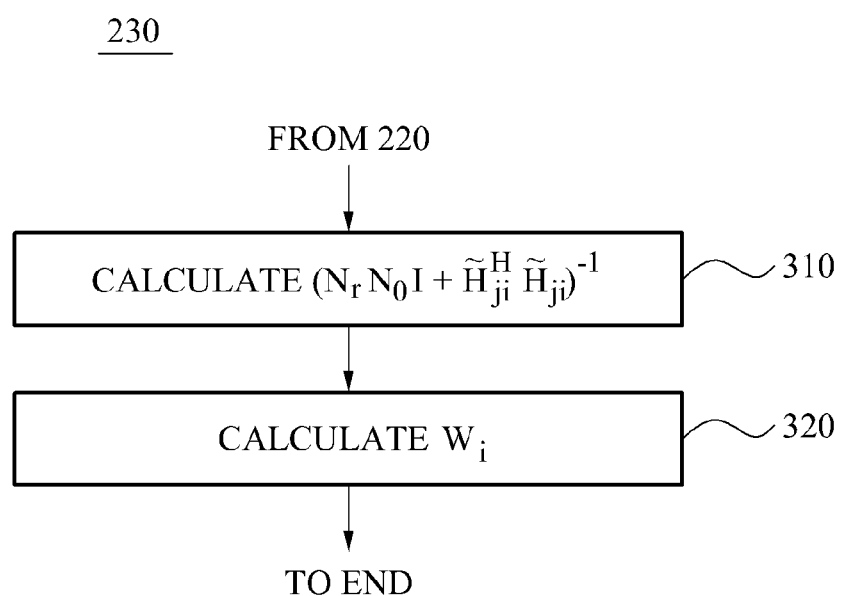
FIG. 3 is a flowchart illustrating an example of an operation of a Joint Leakage Suppression (JLS) algorithm 1 in the communication method of FIG. 2.

FIG. 3 illustrates an example of an operation of the JLS algorithm 1 in the communication method of FIG. 2.

Referring to FIG. 3, in 310, $(N_r N_o I + \tilde{H}_{ji}^H \tilde{H}_{ji})^{-1}$ may be calculated to obtain $w_i$ as described above in Equation 20.

For example, in 320, $w_i = (N_r N_o I + \tilde{H}_{ji}^H \tilde{H}_{ji})^{-1} h_{ji}^H$ may be calculated using $(N_r N_o I + \tilde{H}_{ji}^H \tilde{H}_{ji})^{-1}$ and $h_{ji}$, based on Equation 20.

In this example, $N_r N_o I$ corresponds to a noise component in the target mobile station, and $\tilde{H}_{ji}^H \tilde{H}_{ji}$ corresponds to a leakage component between the target antenna and the at least two base stations.

When $N_{stream}$ is "1," a single $w_i$ may be formed by searching for a right eigenvector corresponding to a maximum $SLNR_{ji}$. When $N_{stream}$ is greater than "1," $N_{stream}$ $w_i$s may be formed by searching for $N_{stream}$ eigenvectors in a descending order of $SLNR_{ji}$. In addition, the normalization operation, for example, $w_i = w_i/\|w_i\|$, may be performed such that a desired beamforming vector may be obtained.

As described above, to obtain the beamforming vector $w_i$, a matrix inverse operation, for example, $(N_r N_o I + \tilde{H}_{ji}^H \tilde{H}_{ji})^{-1}$, may be performed for each antenna in a mobile station. The matrix inverse operation may have a complexity of $O(n^3)$. In the matrix inverse operation, an inverse of a matrix may be calculated $N_r N_{UE}$ number of times and thus, a large number of loads may occur. Hereinafter, a scheme for reducing the loads is described with reference to FIG. 4.

Figure 4:
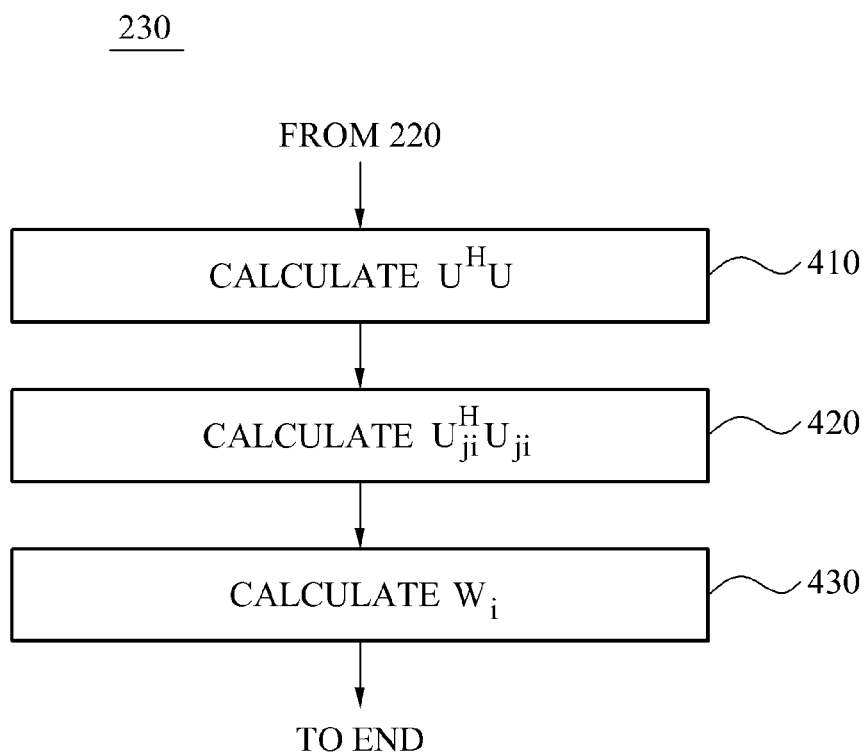
FIG. 4 is a flowchart illustrating an example of a scheme of executing the JLS algorithm 1 with a low complexity in the communication method of FIG. 2.

FIG. 4 illustrates an example of a scheme of executing the JLS algorithm 1 with a low complexity in the communication method of FIG. 2.

Referring to FIG. 4, in 410, a Cholesky factorization may be applied to a sum of the noise component $N_r N_o I$ and a component $H^H H$ that is associated with the overall channel matrix. In this example, the overall channel matrix may satisfy $H = [H_1^H H_2^H \ldots H_{N_{UE}}^H]^H$.

In addition, a first Cholesky factor "U" may be obtained through 410, as shown in $N_r N_o I + H^H H = U^H U$.

In 420, a Cholesky factorization may be applied to a difference of a component $U^H U$ associated with the first Cholesky factor and a component $h_{ji}^H h_{ji}$ associated with the channel vector associated with the target antenna, as shown in Equation 22.

In addition, a second Cholesky factor $U_{ji}$ may be obtained through 420, as shown in $U^H U - h_{ji}^H h_{ji} = U_{ji}^H U_{ji}$.

In 430, $w_i$ may be calculated using $w_i = U_{ji}^{-1} U_{ji}^{-H} h_{ji}^H$ shown in Equation 24.

In this example, the normalization operation, for example, $w_{i=w_i}/\|w_i\|$ may be performed such that the same number of $w_i$s as $N_{stream}$ may be obtained.

Unlike the communication method of FIG. 4, the Cholesky factorization may be applied to $N_r N_o I + \tilde{H}_{ji}^H \tilde{H}_{ji}$, and thus, it is possible to obtain $U_{ji}$ directly without using "U," and it is possible to calculate $w_i$ using the obtained $U_{ji}$.

Figure 5:
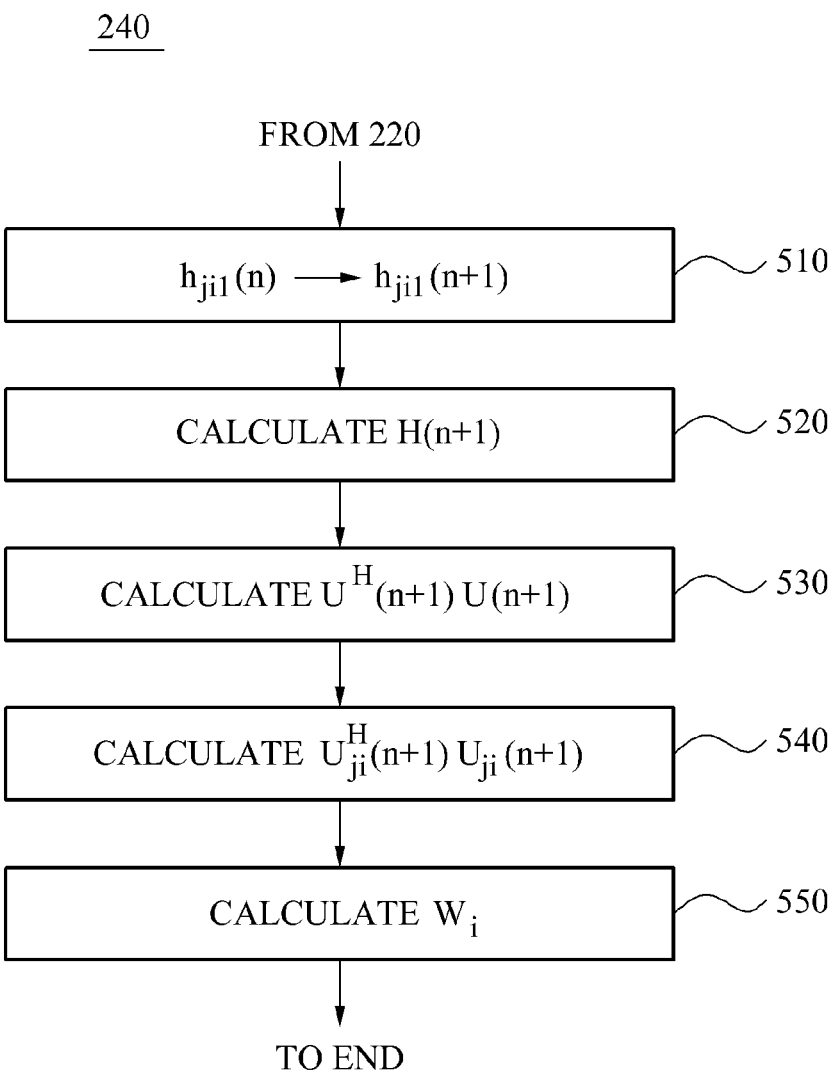
FIG. 5 is a flowchart illustrating an example of an operation of a JLS algorithm 2 in the communication method of FIG. 2.

FIG. 5 illustrates an example of an operation of the JLS algorithm 2 in the communication method of FIG. 2.

Referring to FIG. 5, in 510, when a channel corresponding to an $i_1$-th mobile station (hereinafter, is referred to as a "predetermined mobile station") is changed, channel vectors for each antenna installed in the predetermined mobile station may be updated, as shown in Equation 25.

In 520, the overall channel matrix may be updated, as shown in Equation 27.

In 530, when the overall channel matrix is updated, $U^H(n+1)U(n+1)$ may be calculated using Equation 28. In 540, $U_{ji}(n+1)$ may be calculated using Equation 29 based on $U^H(n+1)U(n+1)$.

In 550, $w_i$ may be calculated based on $w_i = U_{ji}^{-1}(n+1) U_{ji}^{-H}(n+1) h_{ji}^H(n+1)$.

Figure 6:
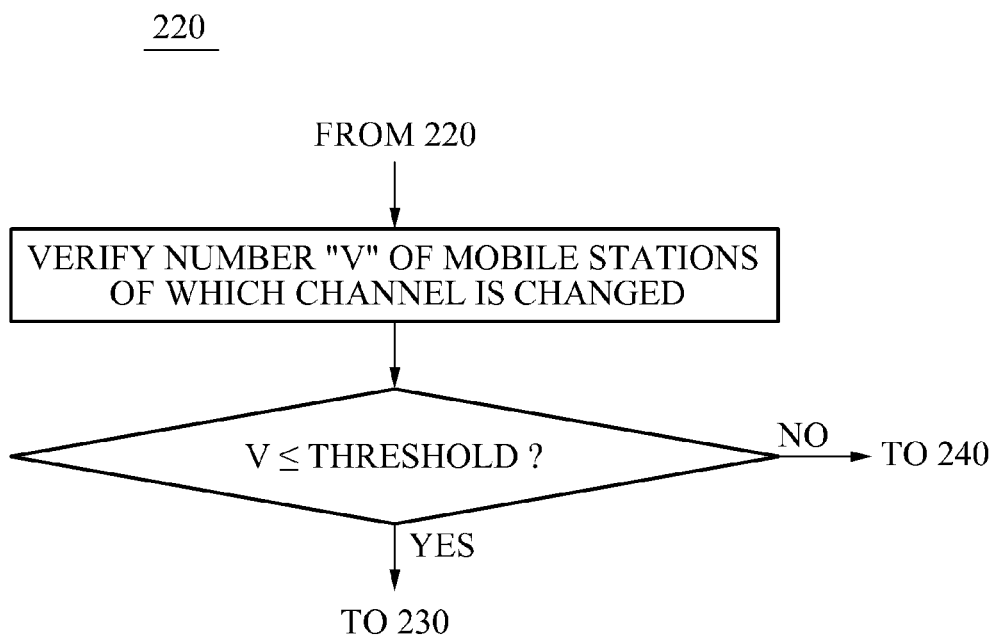
FIG. 6 is a flowchart illustrating an example of a scheme of determining whether to execute the JLS algorithm 1 and executing either the JLS algorithm 1 or the JLS algorithm 2, in the communication method of FIG. 2.

FIG. 6 illustrates an example of a scheme of determining whether to execute the JLS algorithm 1 and executing either the JLS algorithm 1 or the JLS algorithm 2, in the communication method of FIG. 2.

Referring to FIG. 6, a number of mobile stations "V" of which a corresponding channel is changed may be verified. When the number "V" is equal to or less than a threshold, 230 may be performed. Conversely, when the number "V" is greater than the threshold, 240 may be performed.

In other words, either the JLS algorithm 1 or the JLS algorithm 2 may be selected as an optimal algorithm with a low complexity, based on the verified number of mobile stations "V" that have had a change in channel.

The above-described embodiments may also be applied to a single cell communication system. Because the single cell communication system includes only a single base station, the CoMP communication may not be performed in the single cell communication system. However, the base station and at least one mobile station in the single cell communication system may obtain an optimal beamforming vector based on the above descriptions.

For example, a base station and a target mobile station in a single cell communication system may recognize channel vectors between the base station and antennas installed in the target mobile station. The base station and the target mobile stations may recognize at least one channel matrix between the base station and at least one remaining mobile station. In addition, the base station and target mobile station may determine a beamforming vector based on the channel vectors and the at least one channel matrix such that an SLNR for a target antenna among the antennas may be maximized. In this example, the beamforming vector may be used by the base station.

Furthermore, the base station and target mobile station may calculate an inverse matrix for the sum of a noise component in the target mobile station and a leakage component between the target antenna and the base station, and the base station and the target mobile station may calculate the beamforming vector using the inverse matrix and a channel vector that is associated with the target antenna.

The above embodiments of a multi-cell communication system may also be applied to a single cell communication system. For conciseness, further description thereof is omitted.

As a non-exhaustive illustration only, the terminal device or mobile station described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The above-described methods may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method for at least one mobile station that comprises a target mobile station that performs a Cooperative Multi-Point (CoMP) communication with at least two base stations, the communication method comprising:
    recognizing channel vectors between antennas installed in the target mobile station and the at least two base stations, and at least one channel matrix between at least one other mobile station and the at least two base stations; and
    determining a beamforming vector based on the channel vectors and the at least one channel matrix such that a signal-to-leakage-plus-noise-ratio (SLNR) for a target antenna from among the antennas is maximized,
    wherein the beamforming vector is used by the at least two base stations.

2. The communication method of claim 1, wherein the determining comprises:
    calculating an inverse matrix for a sum of a noise component in the target mobile station and a leakage component between the target antenna and the at least two base stations; and
    calculating the beamforming vector using the inverse matrix and a channel vector, wherein the channel vector is associated with the target antenna.

3. The communication method of claim 2, wherein the leakage component is based on at least one channel vector and the at least one channel matrix, and the at least one channel vector is associated with at least one other antenna.

4. The communication method of claim 1, wherein the determining comprises:
    combining channel matrixes of each of the least one mobile station and calculating an overall channel matrix;
    applying a Cholesky factorization to a sum of the noise component and a component associated with the overall channel matrix, and extracting a first Cholesky factor;
    applying a Cholesky factorization to a difference of the channel vector associated with the target antenna and a component associated with the first Cholesky factor, and extracting a second Cholesky factor; and
    calculating the beamforming vector using the second Cholesky factor and the channel vector associated with the target antenna.

5. The communication method of claim 4, further comprising:
    in response to a change of channel occurring in a predetermined mobile station, updating the overall channel matrix, the first Cholesky factor, and the second Cholesky factor, based on the change of channel of the predetermined mobile station from among the at least one mobile station,
    wherein the calculating comprises calculating the beamforming factor using the updated second Cholesky factor.

6. The communication method of claim 4, further comprising:
    verifying a number of mobile stations that have a change in channel; and
    adaptively determining an algorithm based on the verified number, wherein the algorithm is used to determine the beamforming vector.

7. The communication method of claim 6, wherein the adaptively determining comprises adaptively determining the algorithm based on a complexity depending on the verified number.

8. The communication method of claim 1, wherein the determining comprises:
    calculating a noise component in the target mobile station and a leakage component between the target antenna and the at least two base stations;
    applying a Cholesky factorization to a sum of the noise component and the leakage component, and extracting a Cholesky factor; and
    calculating the beamforming vector using the Cholesky factor and the channel vector associated with the target antenna.

9. The communication method of claim 1, wherein the recognizing comprises recognizing channel vectors between the at least two base stations and at least one remaining antenna installed in the target mobile terminal other than the target antenna.

10. A communication method for at least one mobile station in a single cell communication system that comprises a target mobile station, and the single cell communication system comprising a base station, the communication method comprising:
  recognizing channel vectors between antennas installed in the target mobile station and the base station, and at least one channel matrix between at least one other mobile station and the base station; and
  determining a beamforming vector based on the channel vectors and the at least one channel matrix such that an SLNR for a target antenna from among the antennas is maximized,
  wherein the beamforming vector is used by the base station.

11. The communication method of claim 10, wherein the determining comprises:
  calculating an inverse matrix for a sum of a noise component in the target mobile station and a leakage component between the target antenna and the base station; and
  calculating the beamforming vector using the inverse matrix and a channel vector, wherein the channel vector is associated with the target antenna.

12. The communication method of claim 10, wherein the recognizing comprises recognizing channel vectors between the base station and at least one remaining antenna installed in the target mobile terminal other than the target antenna.

13. A non-transitory computer-readable storage medium having stored therein a program to cause a processor of a computer to implement a communication method, the method comprising:
  recognizing channel vectors between antennas installed in the target mobile station and the at least two base stations, and at least one channel matrix between at least one other mobile station and the at least two base stations; and
  determining a beamforming vector based on the channel vectors and the at least one channel matrix such that a signal-to-leakage-plus-noise-ratio (SLNR) for a target antenna from among the antennas is maximized,
  wherein the beamforming vector is used by the at least two base stations.

* * * * *